United States Patent
Grant et al.

(10) Patent No.: US 10,726,655 B2
(45) Date of Patent: Jul. 28, 2020

(54) SHUTTER ASSEMBLY FOR A SELF-SERVICE TERMINAL

(71) Applicants: Andrew Grant, Duluth, GA (US); Ian McFarlane Denny, Perth (GB)

(72) Inventors: Andrew Grant, Duluth, GA (US); Ian McFarlane Denny, Perth (GB)

(73) Assignee: NCR Corporation, Atlanta, GA (US)

( * ) Notice: Subject to any disclaimer, the term of this patent is extended or adjusted under 35 U.S.C. 154(b) by 182 days.

(21) Appl. No.: 15/964,441

(22) Filed: Apr. 27, 2018

(65) Prior Publication Data

US 2019/0333307 A1    Oct. 31, 2019

(51) Int. Cl.
  *G07D 11/14* (2019.01)
  *G07F 19/00* (2006.01)
  *G06Q 20/18* (2012.01)

(52) U.S. Cl.
  CPC ............. *G07D 11/14* (2019.01); *G06Q 20/18* (2013.01); *G07F 19/20* (2013.01); *B65H 2402/45* (2013.01); *B65H 2405/321* (2013.01); *B65H 2701/1912* (2013.01)

(58) Field of Classification Search
  CPC ........ G07D 11/14; G07F 19/20; G06Q 20/18; B65H 2402/45; B65H 2405/321; B65H 2701/1912
  USPC ....... 232/44, 15, 16, 1 D; 235/379; 194/351; 902/9, 13
  See application file for complete search history.

(56) References Cited

U.S. PATENT DOCUMENTS

| | | | | |
|---|---|---|---|---|
| 6,076,648 A | * | 6/2000 | Hatamachi | G07D 7/00 194/206 |
| 6,491,216 B1 | * | 12/2002 | May | G06K 13/0875 235/375 |
| 6,805,285 B2 | * | 10/2004 | Peebles | G06Q 20/1085 235/379 |
| 8,485,339 B2 | * | 7/2013 | Ugajin | G07D 11/50 194/351 |
| 10,297,099 B2 | * | 5/2019 | Iizuka | G07D 7/12 |
| 2001/0025881 A1 | * | 10/2001 | Shepherd | G07F 19/205 235/379 |
| 2001/0056403 A1 | * | 12/2001 | Peebles | G06Q 20/1085 705/43 |
| 2005/0258236 A1 | * | 11/2005 | Boyes | G06Q 20/10 235/379 |
| 2006/0243789 A1 | * | 11/2006 | Lee | G07D 11/14 235/379 |
| 2014/0165473 A1 | * | 6/2014 | Denny | G07F 19/205 49/381 |
| 2015/0279144 A1 | * | 10/2015 | Peters | G07F 19/205 194/344 |

(Continued)

FOREIGN PATENT DOCUMENTS

EP    1139309 A1 * 10/2001    .......... G07F 19/209

Primary Examiner — William L Miller
(74) Attorney, Agent, or Firm — Schwegman, Lundberg & Woessner

(57) ABSTRACT

Disclosed is a shutter assembly for a self-service terminal. The shutter assembly may comprise a track assembly, a shutter door, and a motor. The shutter door may be installed within the track assembly. The motor may be operative to move the shutter door between a first position and a second position and the first position and a third position. The second position may be located opposite the third position.

19 Claims, 4 Drawing Sheets

(56) References Cited

U.S. PATENT DOCUMENTS

2015/0317858 A1* 11/2015 Suetaka ................ G07D 11/14
   194/351
2018/0247286 A1* 8/2018 Denny ............... G06Q 20/1085

* cited by examiner

SHUTTER ASSEMBLY FOR A SELF-SERVICE TERMINAL

BACKGROUND

Self-service terminals (SSTs) may be capable of receiving and dispensing media. For example, SSTs may accept cash and cheques from a customer. In addition, SSTs may dispense cash to a customer. The cash/cheques accepted may be for deposit or to pay for goods and services. The cash dispensed may be change returned to a customer after a purchase is completed or a withdrawal from an account of the customer's accounts.

SUMMARY

Disclosed is a shutter assembly for a self-service terminal. The shutter assembly may comprise a track assembly, a shutter door, and a motor. The shutter door may be installed within the track assembly. The motor may be operative to move the shutter door between a first position and a second position and the first position and a third position. The second position may be located opposite the third position.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
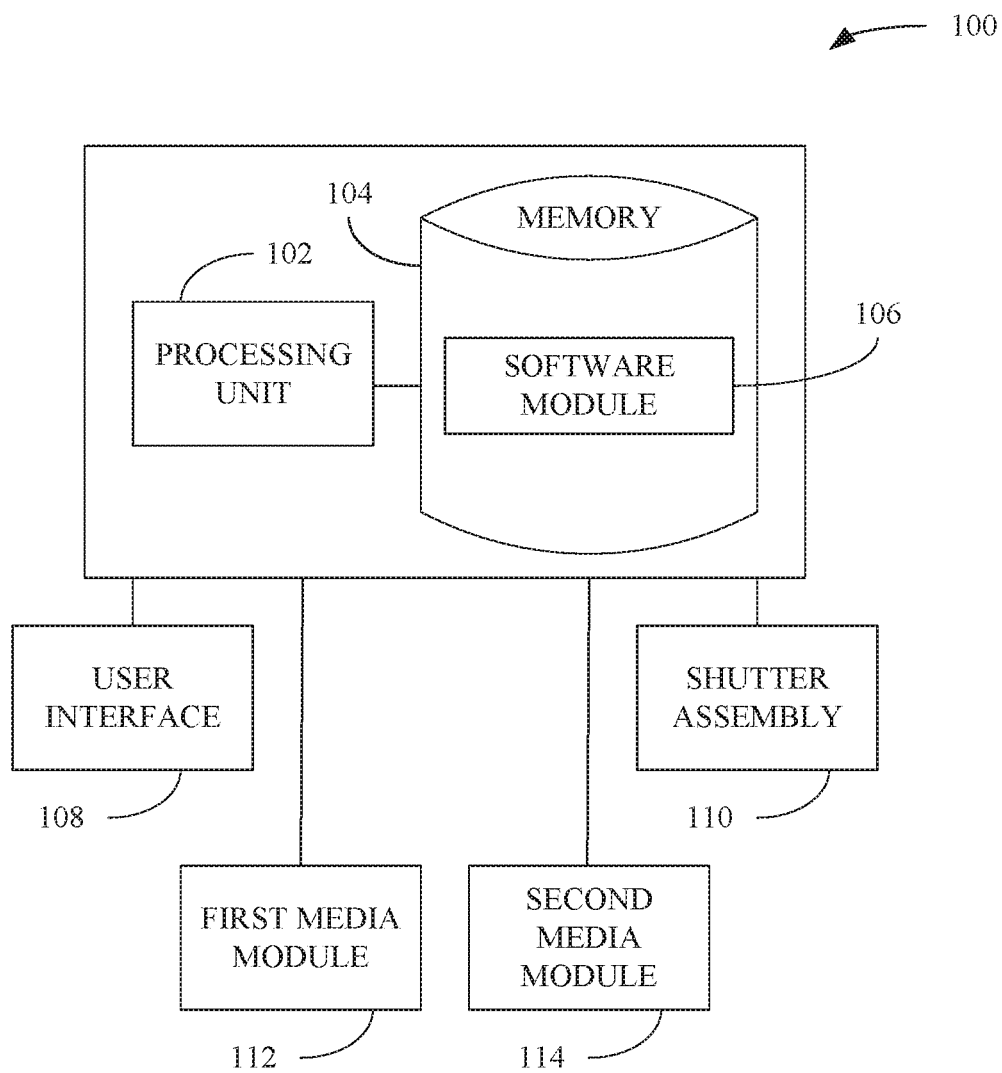
FIG. 1 shows an example self-service terminal consistent with this disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit this disclosure. Instead, the proper scope of any invention disclosed herein is defined by the appended claims.

Self-service terminals (SSTs) may be capable of receiving and dispensing media. For example, SSTs may accept cash and cheques from a customer. In addition, SSTs may dispense cash to a customer. The cash/cheques accepted may be for deposit or to pay for goods and services. The cash dispensed may be change returned to a customer after a purchase is completed or a withdrawal from an account of the customer's accounts.

As disclosed herein, SSTs may be equipped with a two-way shutter. The shutter may allow a shutter door to move in multiple directions. Depending upon whether media is being accepted or dispensed, the shutter door may move in different directions. For example, to accept media, the shutter door may move in a first direction to expose a first opening in the SST. The first opening may be for a first media module. To dispense media, the shutter door may move in a second direction to expose a second opening in the SST. The second opening may be for a second media module.

By exposing either the first opening or the second opening depending on the operation to be performed, the user is relieved of having to determine which of the two openings is to be used for the operation. In addition, programming the SST is simplified because directions for the user as well as safety checks can be minimized. For example, because only one opening is exposed for a particular transaction, programming the SST to make sure the customer inserted media into the correct opening may be eliminated. In addition, instructions to the user as to which opening to insert media may be eliminated since only one opening will be exposed when media is received.

Having two media modules may also simply the internal design of the SSTs. For example, because a first media module is used to accept media and a second media module is used to dispense media, the risk associated with jams caused as the media is attempted to be received and dispensed by a single media module is reduced. For instance, with a single media module, the path the media takes for dispensing and acceptance may be different. As a result, the media may jam as it traverses from a single-entry point to one of two different paths.

In addition, a malfunction of one of the media modules may not result in a complete loss of functionality of the SSTs. For example, should the media module used for receiving media experience a malfunction (e.g., a jam), the media module used to dispense media (e.g., cash) may remain operational and the SST may continue to be used in a limited capacity instead of being shut down completely until the malfunction can be corrected.

FIG. 1 shows an example SST 100 consistent with this disclosure. As shown in FIG. 1, SST 100 may include a processing unit 102 and a memory 104. The memory 104 may include a software module 106. While executing on processing unit 102, software module 106 may perform processes for operating a shutter door, including, for example, one or more stages included in a method 300 described below with respect to FIG. 3.

SST 100 may include a user interface 108. User interface 108 may include any number of devices that allow a user to interface with SST 100. User interface 108 may allow users tinput information such as person identification numbers (PINs), etc. During use, user interface 108 may display instructions for the customer. For example, user interface 108 may instruct the customer to enter his or her PIN and insert or retrieve media.

User interface 108 may include a keypad, a display (touchscreen or otherwise), etc. In addition, user interface 108 may include audio equipment such as speakers, a microphone, a headphone jack, etc. that may be used to allow a customer to interface with SST 100.

SST 100 may include a shutter assembly 110. Shutter assembly 110 is described in greater detail below with respect to FIG. 2. In short, shutter assembly 110 may include a track, a shutter door, and a motor. During use, processing unit 102 may transmit signals to the motor to actuate the shutter door as disclosed herein.

SST 100 also may include a first media module 112. First media module 112 may allow for media, such as cheques, banknotes, or other negotiable instruments or commercial paper to be received by SST 100. For example, first media module 112 may include an escrow that may be coupled to one or more cassettes. As media is received by SST 100, the media may be temporarily stored in the escrow. At the completion of the transaction, the media may be transferred from the escrow to the one or more cassettes for storage until received from the SST by bank personal or others authorized to access the contents of the one or more cassettes.

SST 100 also may include a second media module 114. Second media module 114 may allow for media, such as banknotes, to be received and/or dispensed. For example, second media module 114 may include an escrow that may be coupled to one or more cassettes. During a transaction, banknotes may be retrieved from the one or more cassettes and dispensed to the customer. In addition, cash may be received at second media module 114 and temporarily stored in the escrow before being deposited into the one or more cassettes. As a result, second media module 114 may be able to recycle banknotes for later dispensing.

As disclosed herein, media modules 112 and 114 may allow for accepting and dispensing media. First media module 112 may be a receive only media module in that it may only receive media. The media received at first media module 112 may be media that is not recyclable such as cheques.

As disclosed herein, second media module 114 may both receive and dispense. For example, as discussed above, second media module 114 may receive and recycle banknotes for later distribution as needed.

Second media module 114 also may only dispense depending on the configuration of SST 100. As a dispense only media module, second media module 114 may simply dispense banknotes as needed and first media module 112 may receive banknotes for deposit from customers.

Figure 2A:
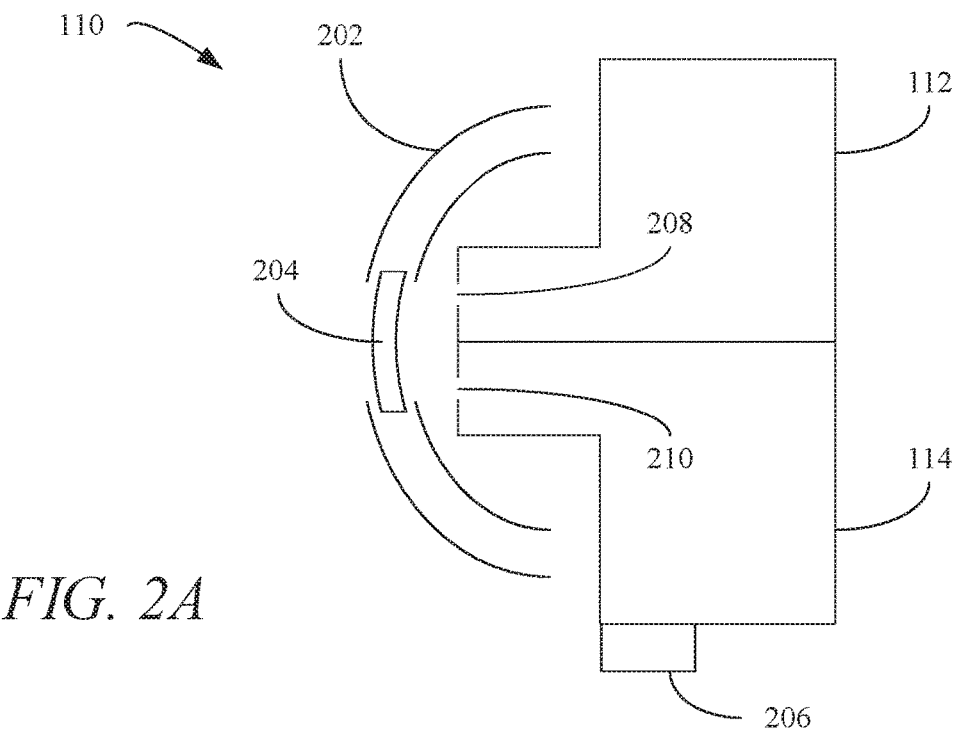
FIGS. 2A, 2B and 2C show an example schematic of shutter assembly consistent with this disclosure.
Figure 2B:
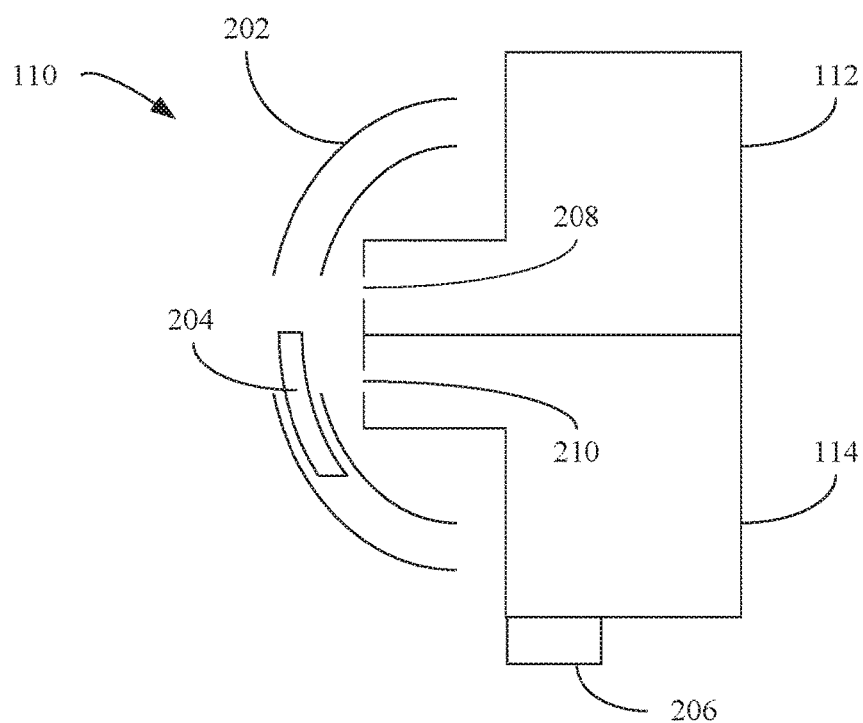
Figure 2C:
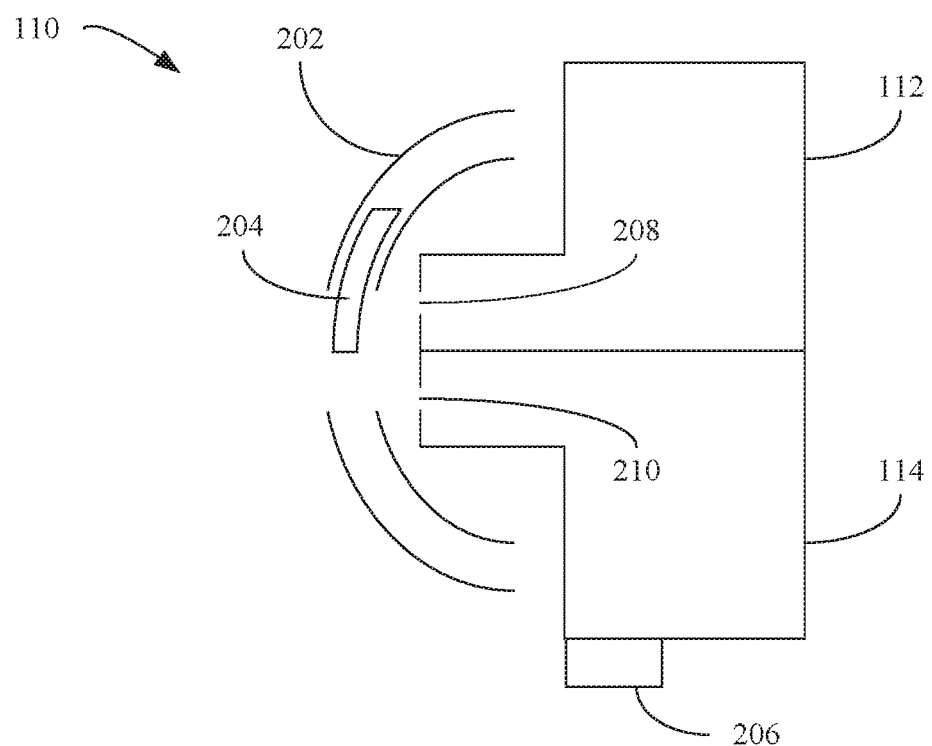

Turning now to FIGS. 2A, 2B, and 2C, FIGS. 2A, 2B, and 2C show a schematic of shutter assembly 110. As shown in FIG. 2, shutter assembly 110 may include a track 202, a shutter door 204, and a motor 206. Track 202 may be located proximate a first opening 208 of first medial module 112 and a second opening 210 of second media module 114. Shutter door 204 may translate within track 202. For example, as shown in FIG. 1, shutter door 204 may be located in a first position. The first position may be shutter door 204 in a closed position where access to media modules 112 and 114 is blocked. Motor 206 may be operatively connected to shutter door 204 via a belt, gear system, etc. such that actuation of motor 206 may cause shutter door 204 to translate as described herein.

During a transaction, processing unit 102 may transmit a signal to motor 206. The signal may cause motor 206 to actuate such that shutter door 204 translates to a second position that exposes the first opening 208 as shown in FIG. 2B. Once the media has been received or dispensed, processing unit 102 may transmit another signal to motor 206. The signal may cause motor 206 to actuate such that shutter door 204 translates back to the first position as shown in FIG. 2A. As an example, the transaction may be to receive a cheque for deposit. As such, shutter door 204 may translate to expose first opening 208 such that the cheque can be received by first media module 112.

During another transaction, or the same transaction, processing unit 102 may transmit a second signal to motor 206. The second signal may cause motor 206 to actuate such that shutter door 204 translates to a third position that exposes the second opening 210 as shown in FIG. 2C. Once the media has been received or dispensed, processing unit 102 may transmit another signal to motor 206. The signal may cause motor 206 to actuate such that shutter door 204 translates back to the first position as shown in FIG. 2A. As an example, the transaction may be to dispense cash the customer wishes to withdraw from an account. As such, shutter door 204 may translate to expose second opening 210 such that the cash can be dispensed via second media module 114.

Figure 3:
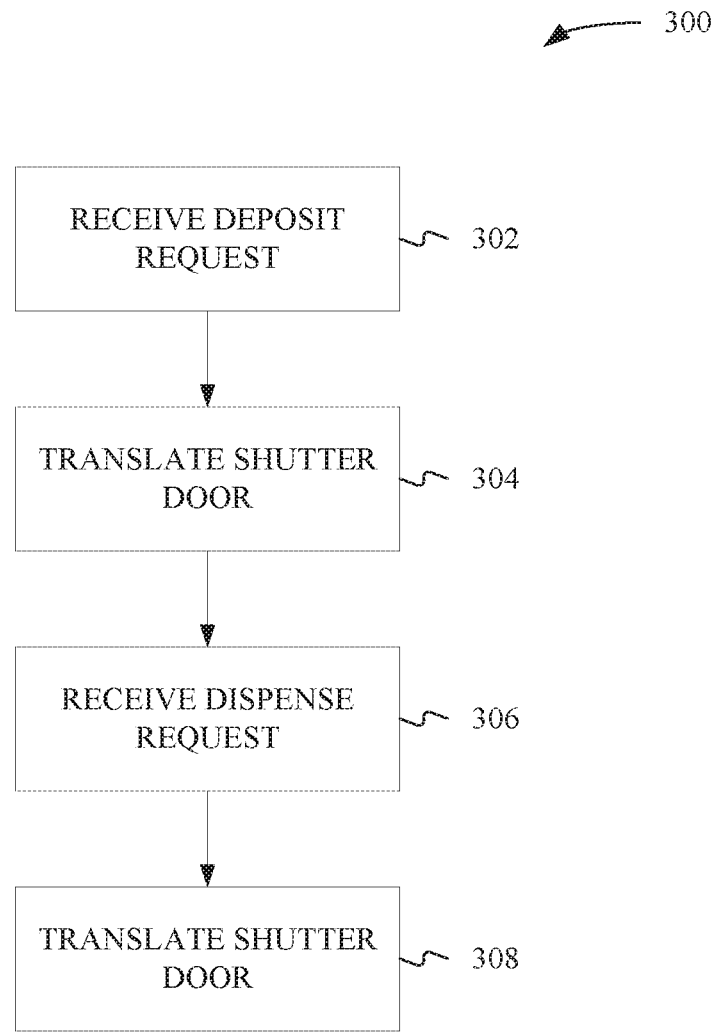
FIG. 3 shows an example method consistent with this disclosure.

FIG. 3 shows an example method 300 consistent with this disclosure. Method 300 will be described in terms of an example where a user deposits a cheque and receives cash back. Method 300 may begin at stage 302 where a deposit request may be received. For example, using user interface 108, the customer may enter information, such as the amount and to which account, to deposit the cheque.

From stage 302 method 300 may proceed to stage 304 where shutter door 204 may be translated. For example, processing unit 102 may transmit a first signal to motor 206 to cause shutter door 204 to translate from the first position to the second position as disclosed herein. Once shutter door 204 has translated, the customer may insert the cheque into first opening 208 of first media module 112.

From stage 304 method 300 may proceed to stage 306 here a dispense request may be received. For example, using user interface 108, the customer may enter a cashback amount. Stage 302 and 306 may be completed together. For example, when entering the deposit information, the customer may also enter the cash back amount.

From stage 306 method 300 may proceed to stage 308 where shutter door 204 may be translated. For example, processing unit 102 may transmit a second signal to motor 206 to cause shutter door 204 to translate from the second position to the third position to expose second opening 210 of second media module 114. Once second opening 210 is exposed, the customer may retrieve his or her cash from SST 100.

Stage 308 may include shutter door 204 translating from the first position to the third position as described above. For example, instead of translating from the second position to the third position, shutter door 204 may stop at the first position while the customer enters the withdrawal/cashback information and then translate from the first position to the third position so that the customer may retrieve his or her cash. As such, method 300 may include additional translate shutter door stages, not shown, where shutter door 204 translates back to the first position before translating to another position.

EXAMPLES

Example 1 is a shutter assembly for a self-service terminal, the shutter assembly comprising: a track assembly; a shutter door installed within the track assembly; and a motor operative to move the shutter door between a first position and a second position and the first position and a third position, the second position located opposite the third position.

In Example 2, the subject matter of Example 1 optionally includes wherein the track assembly is sized to span at least two openings defined by a media module of the self-service terminal.

In Example 3, the subject matter of any one or more of Examples 1-2 optionally include wherein the shutter door has a curved profile.

In Example 4, the subject matter of Example 3 optionally includes wherein the track assembly comprises a curved track.

In Example 5, the subject matter of any one or more of Examples 1-4 optionally include wherein the motor is a stepper motor.

In Example 6, the subject matter of any one or more of Examples 1-5 optionally include wherein movement of the shutter door from the first position to the second position exposes a first media opening in the self-service terminal.

In Example 7, the subject matter of Example 6 optionally includes wherein movement of the shutter door from the first position to the third position exposes a second media opening in the self-service terminal, the second media opening located adjacent the first media opening.

Example 8 is a media handling assembly for a self-service terminal, the media handling assembly comprising: a first media module defining a first media opening; a second media module defining a second media opening; a track located proximate the first media module and the second media module, the track spanning a length defined by at least the first media opening and the second media opening; a shutter door arranged to translate within the track between a first position, a second position, and a third position, the shutter door covering both the first media opening and the second media opening when in the first position; and a motor operable to translate the shutter door from the first position to the second position to expose the first media opening and from the first position to the third position to expose the second media opening.

In Example 9, the subject matter of Example 8 optionally includes wherein the first media module is located on top of the second media module.

In Example 10, the subject matter of any one or more of Examples 8-9 optionally include wherein the first media module and the second media module are a single unit.

In Example 11, the subject matter of any one or more of Examples 8-10 optionally include wherein the first media module only receives media from a customer and the second media module only dispenses media to the customer.

In Example 12, the subject matter of any one or more of Examples 8-11 optionally include wherein the first media module and the second media module receive media from a customer and dispense media to a customer.

Example 13 is a self-service terminal comprising: a first media module defining a first media opening; a second media module defining a second media opening; a track assembly located proximate the first media module and the second media module, the track assembly spanning a length defined by at least the first media opening and the second media opening; a shutter door arranged to translate within the track assembly; a motor mechanically coupled to the shutter door; a processor electrically coupled to the motor; and a memory electrically coupled to the processor and storing instructions that, when executed by the processor, cause the processor to: transmit a first signal to the motor, the first signal operative to cause the shutter door to translate from a first position to a second position such that the first media opening is exposed when the shutter door is in the second position, and transmit a second signal to the motor, the second signal operative to cause the shutter door to translate from the first position to a third position such that the second media opening is exposed when the shutter door is in the second position.

In Example 14, the subject matter of Example 13 optionally includes wherein the shutter door has a curved profile.

In Example 15, the subject matter of Example 14 optionally includes wherein the track assembly comprises a curved track sized to receive a portion of the shutter door.

In Example 16, the subject matter of any one or more of Examples 13-15 optionally include wherein the first media module is located on top of the second media module.

In Example 17, the subject matter of any one or more of Examples 13-16 optionally include wherein the first media module and the second media module are a single unit.

In Example 18, the subject matter of any one or more of Examples 13-17 optionally include wherein the first media module and the second media module each include an escrow mechanically linked to one or more cassettes.

In Example 19, the subject matter of Example 18 optionally includes wherein the instructions, when executed by the processor, further cause the processor to: receive a deposit request; and transmit the first signal in response to receiving the deposit request.

In Example 20, the subject matter of any one or more of Examples 18-19 optionally include wherein the instructions, when executed by the processor, further cause the processor to: receive a dispense request; and transmit the second signal in response to receiving the deposit request.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A shutter assembly for a self-service terminal, the shutter assembly comprising:
   a track assembly sized to span at least two openings defined by a media module of the self-service terminal;
   a shutter door installed within the track assembly; and
   a motor operative to move the shutter door between a first position and a second position and the first position and a third position, the second position located opposite the third position.

2. The shutter assembly of claim 1, wherein the shutter door has a curved profile.

3. The shutter assembly of claim 2, wherein the track assembly comprises a curved track.

4. The shutter assembly of claim 1, wherein the motor is a stepper motor.

5. The shutter assembly of claim 1, wherein movement of the shutter door from the first position to the second position exposes a first media opening of the at least two openings in the self-service terminal.

6. The shutter assembly of claim 5, wherein movement of the shutter door from the first position to the third position exposes a second media opening of the at least two openings in the self-service terminal, the second media opening located adjacent the first media opening.

7. A media handling assembly for a self-service terminal, the media handling assembly comprising:
   a first media module defining a first media opening;
   a second media module defining a second media opening;
   a track located proximate the first media module and the second media module, the track spanning a length defined by at least the first media opening and the second media opening;
   a shutter door arranged to translate within the track between a first position, a second position, and a third position, the shutter door covering both the first media opening and the second media opening when in the first position; and a motor operable to translate the shutter door from the first position to the second position to expose the first media opening and from the first position to the third position to expose the second media opening.

8. The media handling assembly of claim 7, wherein the first media module is located on top of the second media module.

9. The media handling assembly of claim 7, wherein the first media module and the second media module are a single unit.

10. The media handling assembly of claim 7, wherein the first media module only receives media from a customer and the second media module only dispenses media to the customer.

11. The media handling assembly of claim 7, wherein the first media module and the second media module receive media from a customer and dispense media to a customer.

12. A self-service terminal comprising:
a first media module defining a first media opening;
a second media module defining a second media opening;
a track assembly located proximate the first media module and the second media module, the track assembly spanning a length defined by at least the first media opening and the second media opening;
a shutter door arranged to translate within the track assembly;
a motor mechanically coupled to the shutter door;
a processor electrically coupled to the motor; and
a memory electrically coupled to the processor and storing instructions that, when executed by the processor, cause the processor to:
transmit a first signal to the motor, the first signal operative to cause the shutter door to translate from a first position to a second position such that the first media opening is exposed when the shutter door is in the second position, and transmit a second signal to the motor, the second signal operative to cause the shutter door to translate from the first position to a third position such that the second media opening is exposed when the shutter door is in the second position.

13. The self-service terminal of claim 12, wherein the shutter door has a curved profile.

14. The self-service terminal of claim 13, wherein the track assembly comprises a curved track sized to receive a portion of the shutter door.

15. The self-service terminal of claim 12, wherein the first media module is located on top of the second media module.

16. The self-service terminal of claim 12, wherein the first media module and the second media module are a single unit.

17. The self-service terminal of claim 12, wherein the first media module and the second media module each include an escrow mechanically linked to one or more cassettes.

18. The self-service terminal of claim 17, wherein the instructions, when executed by the processor, further cause the processor to:
receive a deposit request; and
transmit the first signal in response to receiving the deposit request.

19. The self-service terminal of claim 17, wherein the instructions, when executed by the processor, further cause the processor to:
receive a dispense request; and
transmit the second signal in response to receiving the deposit request.

* * * * *